Dec. 7, 1937.   H. R. ISLER   2,101,544
MILLING MACHINE TRANSMISSION AND CONTROL MECHANISM
Filed March 26, 1936   3 Sheets-Sheet 1

INVENTOR.
HERMAN R. ISLER
BY
A. K. Parsons
ATTORNEY.

Dec. 7, 1937.  H. R. ISLER  2,101,544
MILLING MACHINE TRANSMISSION AND CONTROL MECHANISM
Filed March 26, 1936   3 Sheets-Sheet 2
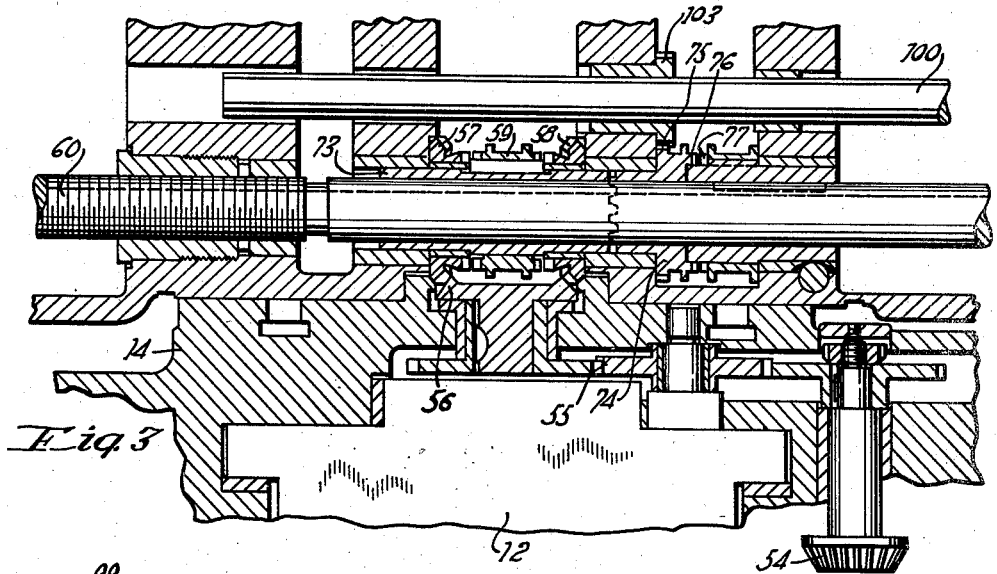
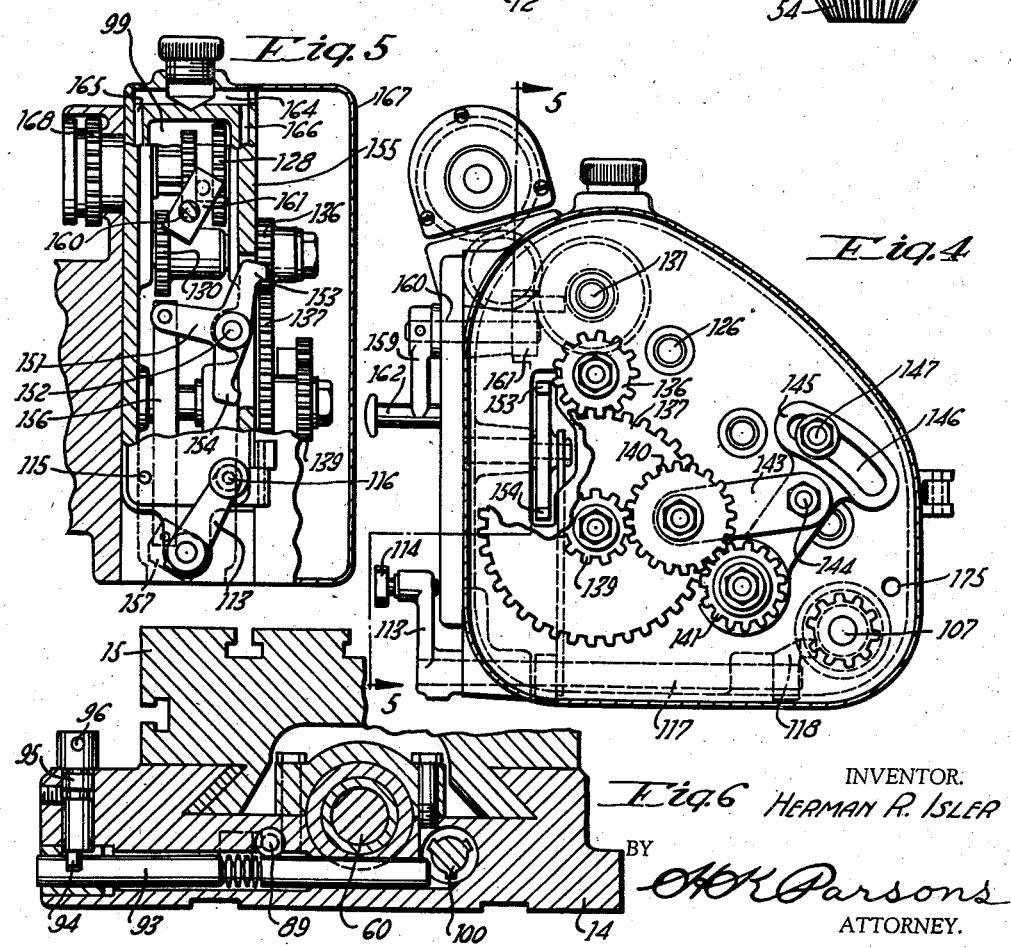
INVENTOR.
HERMAN R. ISLER
BY
AHK Parsons
ATTORNEY.

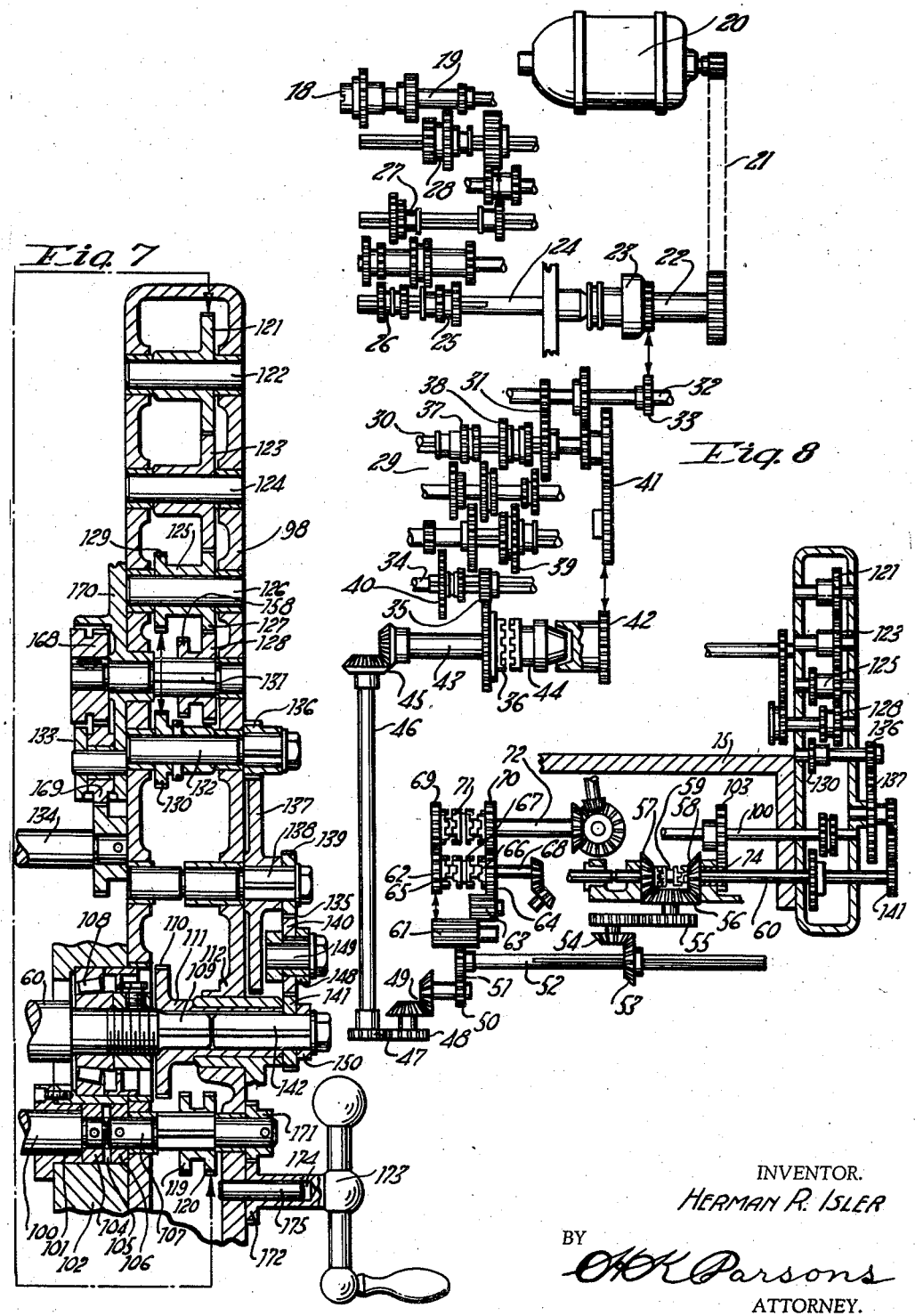

Patented Dec. 7, 1937

2,101,544

UNITED STATES PATENT OFFICE 2,101,544

MILLING MACHINE TRANSMISSION AND CONTROL MECHANISM

Herman R. Isler, Norwood, Ohio, assignor to The Cincinnati Milling Machine Co., Cincinnati, Ohio, a corporation of Ohio Application March 26, 1936, Serial No. 70,991

8 Claims. (Cl. 90—21)

This invention relates to milling machines and more particularly to improvements in attachments therefor.

One of the objects of this invention is to provide a simple short and long lead attachment for milling machines.

Another object of this invention is to provide an attachment for the foregoing purposes which is extremely compact, light in weight, and inexpensive to manufacture.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a section on the line 3—3 of Figure 2.

Figure 4 is a section on the line 4—4 of Figure 1.

Figure 5 is a section on the line 5—5 of Figure 4.

Figure 6 is a section on the line 6—6 of Figure 2.

Figure 7 is an expanded view of the gearing in the gear box of the attachment.

Figure 8 is a diagrammatic view of the entire transmission of the machine.

Figure 1:
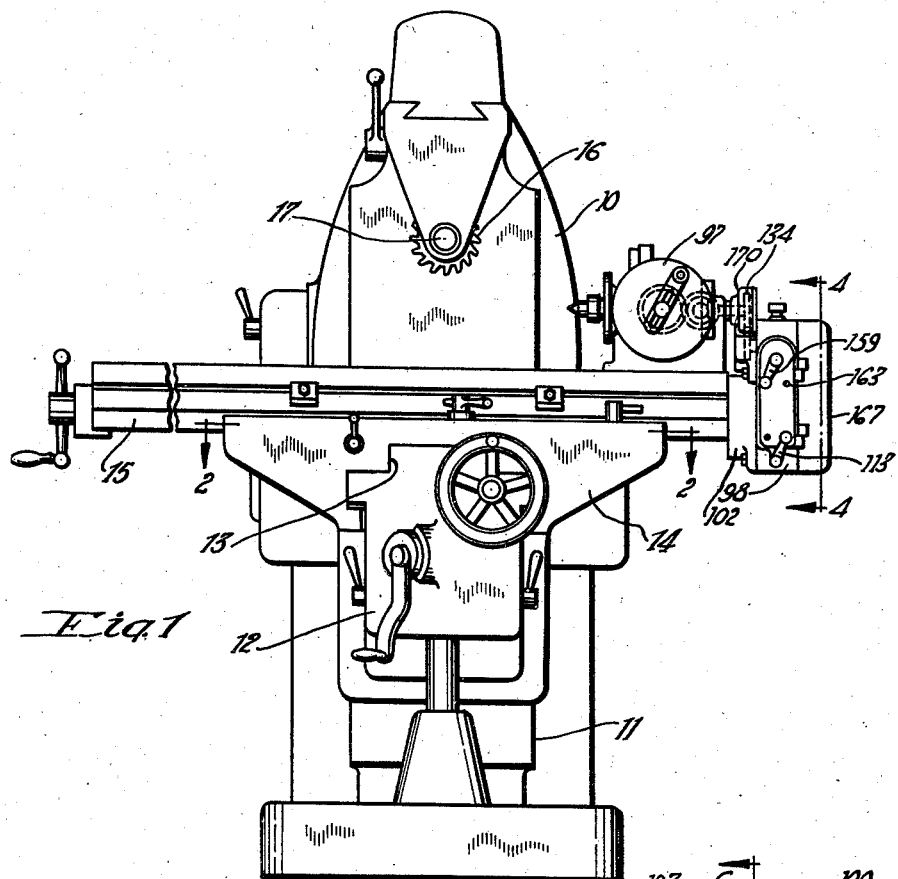
Figure 1 is a front elevation of a milling machine embodying the principles of this invention.

In Figure 1 of the drawings is shown a conventional type of knee and column type milling machine having an upright or column 10, upon one wall of which is formed guide ways 11 for receiving and guiding a knee 12 for vertical movement. The knee has horizontal guide ways 13 upon which is reciprocably mounted a saddle 14. The saddle, in turn, has horizontal guide ways extending transversely to the guide ways 13 for receiving and supporting a table 15 which is movable transversely of the axis of the cutter 16. The cutter may be supported for rotation on an arbor 17 which may be securely attached in driving relation to the nose 18 of a cutter spindle 19.

As shown in Figure 8, the cutter spindle may be driven from a prime mover 20 which may be housed in the interior of the column and connected through suitable motion transmitting means, such as a chain or belt 21 to a drive shaft 22. This shaft may be selectively connected through shiftable clutch means 23 to the primary shaft 24 of a variable speed transmission comprising a plurality of shiftable gears 25, 26, 27 and 28 whereby the spindle 19 may be driven at a suitable number of speeds.

As is conventional in machines of the type under consideration, means are provided for actuating the knee, saddle and table by power, and such power means may comprise a feed box indicated generally by the reference numeral 29 having a primary drive shaft 30, which is connected by gearing 31 to shaft 32, the latter being connected by gearing 33 for continuous rotation by the prime mover 20.

The feed box may have a final output shaft 34 connected by suitable gearing 35 to the feed clutch member 36, and a plurality of shiftable gears 37, 38, 39 and 40 may serve to change the output feed rate of the feed box.

For rapid movements of the various supports the shaft 32 may be connected through the gear train 41 to the rapid traverse gear 42 mounted in co-axial relation to the clutch member 36 and supporting shaft 43.

A feed rapid traverse selector member 44 may be interposed between the feed clutch member 36 and the rapid traverse gear 42 for selectively connecting one or the other for actuation of shaft 43.

This shaft is connected through bevel gearing 45 to a vertical spline shaft 46 which may be mounted exteriorly of the column 10 and connected in splined relation to gear 47 carried by a bracket on the knee whereby motion may be continuously transmitted to the various work supporting members regardless of the vertical position of the knee.

The gear 47 may be connected through a train comprising spur gear 48, bevel gears 49 and spur gear 50 to gear 51, which gear serves as a common actuator for the table, saddle and knee.

The gear 51 is keyed to the end of spline shaft 52 which has a bevel gear 53 splined thereon but movable with the saddle for actuation of the table. The gear 53 meshes with a bevel gear 54, which is connected by a spur gear train 55 to bevel gear 56 of a reversing mechanism comprising intermeshing bevel gears 57 and 58 having opposed clutch faces formed thereon.

An intermediate shiftable clutch member 59 serves to interconnect bevel gears 57 and 58 to the lead screw 60 for reverse actuation of the table.

The gear 51 also intermeshes with a wide spur gear 61, which directly intermeshes with gear 62 and indirectly, through idler 63, intermeshes with gear 64 whereby gears 62 and 64 are rotated in opposite directions. These gears have clutch faces 65 and 66 formed on opposing faces thereof and are connectible, by the intermediate clutch member 67, to the saddle drive shaft 68.

The gears 62 and 64 intermesh with gears 69 and 70 respectively for rotation thereof in opposite directions and an intermediate clutch member 71 serves to interconnect these gears for opposite rotation of the knee drive shaft 72. Thus, by means of the foregoing mechanism, any one of the work supporting elements, such as the table, saddle or knee, may be power actuated in opposite directions. Suitable manually operable or trip operable control elements may be provided for actuation of these parts in accordance with conventional practice.

The reverser clutch 59 for the table is not actually splined on the lead screw 60 but, as shown in Figure 3, is splined on a sleeve 73 which is supported for free rotation with respect to the lead screw 60. This sleeve is integrally connected with a rotatable member 74 which has gear teeth 75 formed on its periphery and clutch teeth 76 formed upon an end face thereof. A shiftable clutch member 77, which has a splined connection with the lead screw 60, serves to interconnect the sleeve 73 for rotation of the lead screw 60 during conventional plain milling operations.

The table clutch member 59 is shifted by a fork 78 which is attached to the shifter rod 79. This rod has a slot 80 into which fits one end of a bell crank 81, the other end being connected by a link 82 to an arm 83 integral with shaft 84. This shaft has a manually operable handle 85. Integral with the arm 83 is a detent mechanism comprising the spring pressed detent 86 which interengages V-shaped notches 87 formed integral with the arm 83.

The shiftable clutch member 77 is moved into and out of engagement with clutch teeth 76 by a shifter fork 88 mounted on a shifter rod 89 which has integrally formed cylindrical rack teeth 90 interengaging an elongated pinion 91. This pinion also meshes with cylindrical rack teeth 92 formed on a shifter rod 93 which is moved back and forth by means of an eccentric connection 94, Figure 6, with a rotatable shaft 95. This shaft has a manually operable handle 96 on the upper end thereof.

Figure 2:
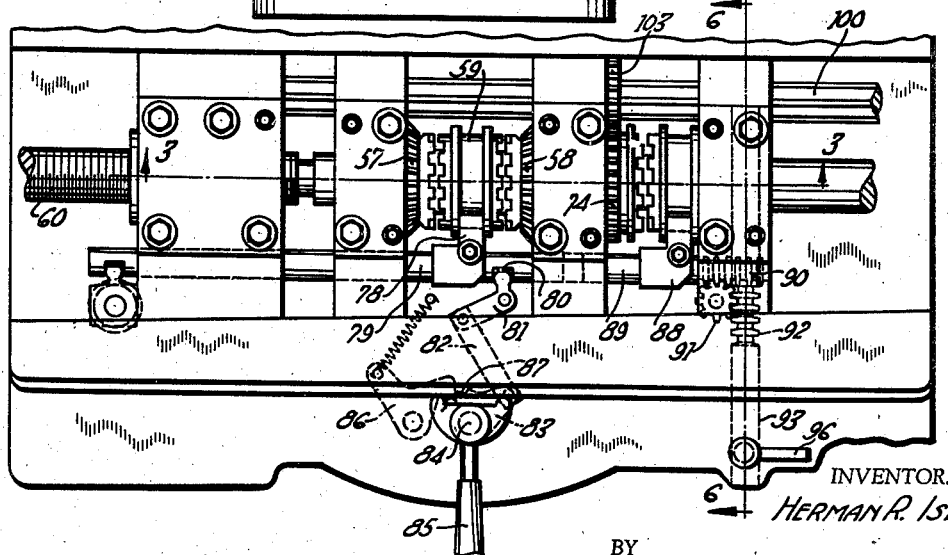
Figure 2 is a detailed section on the line 2—2 of Figure 1.

It will be noted from Figures 2 and 6 that when the handle 96 is rotated clockwise, as viewed in Figure 2, that the rack bar 93 will move toward the right as viewed in Figure 6, due to the construction of the eccentric connection, which will result in counterclockwise rotation of the pinion 91 and movement of the shifter rod 89 to the left, as viewed in Figure 2, and thereby engagement of clutch 77. When this clutch is engaged the machine is set for plain milling operations.

For spiral milling operations a spiral dividing head, such as 97, is applied to the table 15 and a detachable mechanism is provided for coupling the head 97 for actuation through the same reversing clutch that is utilized for operating the table during plain milling operations. This invention is directed more particularly to an improved form of detachable mechanism which will now be described in detail.

This mechanism comprises a detachable bracket 98 in which is formed an enclosed chamber 99 for housing most of the gearing, thereby protecting same from chips and foreign material, and making it possible to adequately lubricate the same.

This bracket includes a spline shaft 100 which is inserted in a bore 101 formed in the back apron 102 of the table, as shown in Figure 7, and as shown in Figure 3, this shaft passes through the hub of a gear 103 journaled for rotation in the saddle of the machine.

Since the shaft 100 is utilized, not only for rotating the head 97, but also for rotating the lead screw 60, an interlock is provided whereby the clutch 77 must be disengaged whenever the shaft 100 is inserted in the machine to guard against actuation of the lead screw 60 from two different sources and at two different rates at the same time. This interlocking connection is obtained by extending the rack bar 93, as shown in Figure 6, a sufficient amount that when it is moved to the right, as viewed in Figure 6, it will interfere with insertion of the spline shaft 100; or on the other hand, if the parts are in the position shown in Figure 6, movement of the rack bar 93 to the right to effect engagement of clutch 77, while the spline shaft 100 is in position, will be prevented.

The gear 103 is in engagement with the gear teeth 75 of member 74 whereby it will always be rotated whenever the table reversing clutch 59 is shifted to either one of its power transmitting positions. This means that the shaft 100 will be reversely rotated, depending upon the position of clutch 59.

As shown, in Figure 7, the shaft 100 has a collar 104 pinned thereto and this collar has clutch teeth 105 formed on one face thereof, and these clutch teeth are adapted to interengage with clutch teeth formed on collar 106 pinned on shaft 107. The shaft 107 is held against longitudinal movement in the bracket 98. This means that when the bracket is detached from the end of the table the clutch teeth will be separated and the driving connection broken.

The lead screw 60 which is supported in antifriction bearings 108 in the back apron 102 of the table, as shown in Figure 7, is normally provided with a splined extension 109 and this is utilized for effecting a driving connection of the gearing in the bracket to the lead screw. To this end the bracket has a gear 110 which has an elongated hub 111 which passes through the wall 112 of the bracket and is held against longitudinal movement with respect thereto.

As previously mentioned, this invention deals with a mechanism for cutting long and short leads and for the purposes of clarification, the range of short leads may be assumed to be from ¼" to 10", and the range of the long leads may be assumed to be from 10" to 400". To this end, the bracket is provided with a control lever 113, which as shown in Figures 1, 4 and 5, has two positions, one of which is for adjusting the mechanism to yield short leads and the other position for yielding long leads. The lever 113 has a spring actuated plunger 114 in the end thereof which is adapted to engage holes 115 and 116 formed in the bracket for maintaining the lever in either one of its positions.

When the lever 113 is in the position shown in Figures 1 and 5 the mechanism is set for cutting short leads. In other words, the lever 113 is secured to a shaft 117 which has a shifter arm 118 secured to the end thereof and interengaging a gear couplet comprising gears 119 and 120 which are more particularly shown in Figure 7. The gear 120 engages a gear 121 mounted for rotation on a shaft 122. The gear 121 rotates, through gear 123 supported on shaft 124, a gear couplet 125 supported for rotation on shaft 126, and this couplet comprises a gear 127, which meshes with gear 128, and a gear 129, which meshes with a gear 130. The gear 128 is splined on shaft 131, and the gear 130 is fixed with shaft 132. Rotation of the spline shaft 100 will thus rotate, through gears 120, 121, 123, 127 and 128, the shaft 131, which is connected through the gear train, indicated generally by the reference numeral 133, to the drive shaft 134 of the head 97. At the same time, the shaft 100 will drive, through gears 120, 121, 123, 127, 129 and 130, the shaft 132 which is connected by change gears, indicated generally by the reference numeral 135, to the lead screw 60. It will be noted that the gear train from shaft 100 to the attachment drive shaft 134 has practically no change in rate, while the change gearing 135 effects a substantial reduction in rate due to the fact that the shaft 132 has a small pinion 136 engaging the large gear 137, which is splined on shaft 138. The spline shaft 138 is connected by the gear train 139, 140 and 141 to the shaft 142, which has a drive fit in the hub 111 of gear 110. Thus the lead screw may be rotated at a very greatly reduced rate as respects the dividing head 97 which makes it possible to cut very short leads.

Variations in the length of the short lead however, are obtained by substituting other gears for the change gears 139 and 141. In this case the gear 140 is merely an idler gear, being rotatably supported in the end of an arm 143 which is pivotally connected at 144 to the adjustable arm 145. The arm 145 has an elongated hub, as shown in Figure 7, by which it is rotatably supported in the wall 112 of the bracket by means of which it may be oscillated to various positions to assist in positioning the gear 140 in mesh with the gears on shaft 138 and 142. The arm 145 has an elongated slot 146 formed in the end thereof and a fixed clamping screw 147 passes through this slot for securing the arm in various adjusted positions.

It will be noted from Figure 4 that the train of gears connecting the shaft 138 to the shaft 142 is a simple gear train, and although a large number of combinations can be obtained by substituting other gears for the gears 138 and 141, still additional combinations may be obtained by substituting for the spur gear 140 a compound gear whereby an additional series of combinations may be obtained. In such a case, the spacer 148 on pin 149, which supports gear 140, may be removed to permit substitution of an additional gear and the spacer 150 on shaft 142 may be reversed in position with respect to gear 141 whereby gear 141, or any other gear substituted therefor, will now mesh with the compound gear substituted for the spacer 148. When it is stated that the number of combinations obtainable with the simple gear train shown, added to the additional combinations that may be obtained with the use of compound gears, is of the order of thousands, the range and capacity of this simple mechanism will be more fully realized.

When it is desired to cut long leads, the long and short lead seclector lever 113 is moved counterclockwise, as viewed in Figures 1 to 5, to its other position which thereby moves gear 119 into engagement with gear 110, Figure 7. Since the gear 110 is directly connected to the lead screw it will be seen that the lead screw will be rotated at a rate more nearly approximating the rate of the shaft 100, the actual rate depending, of course, upon the ratio of the gear 119 to the gear 110.

In setting up the machine for long leads the large gear 137 and the pinion 136 are interchanged, and to insure that this is done an interlock is provided which comprises a lever 151, Figure 5, which is pivoted at 152 and which has a pair of arms 153 and 154 which are adapted to alternately project beyond the face 155 to insure that the large gear 137 is in its proper position. The arm 151 is connected by a link 156 to a crank arm 157 integral with the selector lever 113. In other words, if the large gear 137 has not been removed from the position shown in the drawings and mounted upon the shaft 132 it will be impossible for the operator to move the selector lever to the long lead position because the contact arm 154 will abut the rear face of the gear 137 and thereby prevent engagement of gear 119 with gear 110. Additionally, if the large gear 137 still remains on the shaft 132 when the operator throws the selector lever 113 to the short lead position the contact arm 153 will abut the rear face of gear 137 and prevent engagement of gear 120 with gear 121. It will thus be seen that this interlock serves to insure that the large gear 137 is in its proper position when the selection between a long lead and a short lead is made.

The same simple gearing and compound gearing is utilized to interconnect shaft 142 with shaft 138 to produce the various series of long leads that may be desired. The power will be transmitted through this train of gearing in a reverse direction since the shaft 142 is now the driver and the shaft 132 is the driven member. The power from shaft 132 will now be transmitted through gear 130 to gears 129 and 127, which means that gear 127 will be rotating in one direction and gear 130 will be rotating in an opposite direction. The shaft 131 carries a gear couplet of which gear 128 forms a part thereof. The other gear 158 of the couplet is shiftable into mesh with gear 130 to effect rotation of shaft 131 in one direction, or the gear 128 is shifted into mesh with gear 127 to effect rotation of shaft 131 in an opposite direction. Thus, the attachment drive shaft 134 may be rotated in opposite directions with respect to the direction of rotation of the lead screw 60. The couplet 158—128 thus serves as a reverser for changing the direction of rotation of the attachment with respect to the lead screw, regardless of whether long leads or short leads are being cut. The couplet 158—128, which constitutes a reverser, is shifted by the reverse control lever 159 secured to one end of shaft 160, this shaft having a shifter arm 161 secured to the end thereof and interengaging the couplet. The end of the arm 159 may have a spring pressed plunger 162 adapted to engage in holes 163 formed in the bracket, as shown in Figure 1 of the drawings.

It will thus be seen that suitable control levers are provided for making a major selection of leads and for determining the direction of rotation of the work with respect to the direction of movement of the table and thereby the hand at which the spiral or helix is to be cut.

It will be noted from Figures 5 and 7 that most of the permanent gearing is enclosed in a chamber to protect the same and this chamber has a lubricant reservoir 164 formed in the upper part thereof from which suitable channels or bores 165 and 166 extend downwardly in suitable directions to lubricate the various rotating parts within the chamber. The gears that have to be changed are mounted on the exterior wall or face 155 and a pivoted cover 167 serves to enclose these gears after any necessary changes have been made.

It will be noted from Figure 7 that the final gear train 133 is mounted on the opposite exterior face of the bracket and next to the attachment and that the first two gears 168 and 169 are carried by a small bracket 170 in such a manner that the gear 169 may be pivoted about the axis of shaft 131 a sufficient amount to compensate for changes in the center line distance between the attachment drive shaft 134 and the lead screw 60.

For manual operation of the parts, the shaft 107 has a gear 171 which is adapted to be interengaged by a gear 172 formed integral with a ball crank lever 173. This lever has a bore 174 which is adapted to fit over a fixed pin 175 for supporting the gear 172 in rotatable engagement with gear 171. In order to apply the ball crank lever 173 to the pin 175 the cover 167 must be swung open. This helps to insure that the manually operable lever 173 will be removed during power operation of the machine.

There has thus been provided a very much improved, simplified and inexpensive mechanism for the purposes indicated.

I claim:

1. In a milling machine having a table, a work rotating attachment carried thereby, a drive shaft and a lead screw supported by the table, the combination of means for actuating the attachment and lead screw including a bracket detachably connected to the table, a pair of gears carried by the bracket, a gear train connecting the gears for simultaneous rotation in opposite directions by the drive shaft, reduction gearing connecting one of said gears to said lead screw, and means to selectively connect either of said gears for actuation of the attachment.

2. In a milling machine having a work rotator and a table actuator, the combination with a power shaft, of means for simultaneously operating said parts including a bracket detachably connectible to said table, a pair of adjacently related shafts carried by the bracket and intercoupled for simultaneous rotation in opposite directions, means for driving one of said pair of shafts from the power shaft, a change gear mechanism coupling the other shaft to the table actuator, and means for selectively connecting the work rotator to one of said pair of shafts in accordance with the desired direction of rotation with respect to the direction of rotation of the table actuator.

3. In a milling machine having a table, a power shaft and a lead screw supported thereby, the combination of a detachable housing having means therein for connecting the power shaft to the lead screw and attachment for simultaneous actuation at different proportionate rates, said housing including an enclosed chamber having a drive shaft journaled therein and projecting beyond one wall of the chamber, rate change means supported on the exterior of said housing for coupling said shaft to the table lead screw, means within said chamber for coupling the drive shaft to the power shaft, and means supported on another exterior wall of said housing and selectively connectible with said drive shaft for actuating said attachment, and a cover plate for enclosing said rate change means.

4. In a long and short lead attachment to adapt a milling machine for spiral cutting, the combination of a housing attachable to the machine table and having a transmission therein including a pair of parallel shafts journaled in the housing, a large gear and a pinion adapted to be interchangeably mounted on said shafts, a third shaft journaled in the housing, a simple gear train rate changer coupling one of said pair of shafts to the third shaft, means to selectively apply power to one of said parallel shafts or to said third shaft, interlocking means requiring said gear and pinion to be mounted in such relation that the pinion is always the driver, and means to selectively connect a spiral milling attachment or the table lead screw to the output end of said transmission and the remaining element to the input end of said transmission.

5. In a long and short lead attachment to adapt a milling machine for spiral cutting, the combination of a housing attachable to the machine table and having a transmission therein including a pair of parallel shafts journaled in the housing, a large gear and a pinion adapted to be interchangeably mounted on said shafts, a third shaft journaled in the housing, a simple gear train rate changer coupling one of said pair of shafts to the third shaft, means to selectively apply power to one of said parallel shafts or to said third shaft, interlocking means requiring said gear and pinion to be mounted in such relation that the pinion is always the driver, means to selectively connect a spiral milling attachment or the table lead screw to the output end of said transmission and the remaining element to the input end of said transmission, and means to substitute compound gearing in said simple train to obtain additional rate changes.

6. In a milling machine having a table, a lead screw therefor, a power driven reverser, and means to selectively connect the output of said reverser to the lead screw, the combination with a spiral milling attachment applicable to said table and having a rotor, of means for actuating said rotor and lead screw including a shaft adapted to be connected to the output of said reverser, a housing detachably connectible to the table and including a member automatically connectible to said shaft, and a second member automatically connectible to the lead screw upon application of the housing to the table, rate change gearing carried by the housing having terminal members, and means for simultaneously connecting the power shaft and lead screw to one of said terminal members and the spiral milling attachment to the other terminal member; or to simultaneously connect the power shaft and attachment rotor to one of said terminal members and the lead screw to the other terminal member.

7. In a milling machine having a reciprocable work table, an attachment carried thereby and a power shaft and a lead screw supported by the table, the combination of means for actuating the attachment and lead screw from the power shaft including a bracket detachably mounted on the end of said table, a gear train mounted in the bracket and terminating in a reversing mechanism, a rate change gearing connectible by said reversing mechanism in serial power transmitting relationship to said gear train for actuating the attachment, a second rate change gearing having interchangeable members and terminal rotors whereby the driven rotor is rotated at a lesser speed than the other rotor, and means for selectively connecting said power shaft with said gear train or with one of said rotors.

8. In a milling machine having a fixed support, a table reciprocably mounted thereon and an attachment carried by the table and having a driving rotor, the combination of means for actuating the table and rotor including a lead screw and a power shaft rotatably supported by the table, a bracket detachably connectible to the table, a rate change gearing carried by the bracket with its output connected to said rotor, a second rate change gearing having terminal members and interchangeable gears whereby the terminal rotor, that is, selectively the driven one, will rotate at a lesser speed than the driver, and means to selectively connect the power shaft to one end of said first-named rate change gearing and to one of the terminal rotors of the second named rate change gearing and the other terminal rotor to said lead screw or to connect said power shaft to said lead screw and to one terminal rotor of said second-named rate change gearing and the other terminal rotor to the driving end of said first-named rate change gearing.

HERMAN R. ISLER.